United States Patent
Callewaert et al.

(10) Patent No.: US 12,321,614 B1
(45) Date of Patent: Jun. 3, 2025

(54) GDDR RDF/QAR BANDWIDTH REDUCTION

(71) Applicant: Dell Products L.P., Hopkinton, MA (US)

(72) Inventors: Peter Callewaert, Eernegem (BE); Dennis Trulli, Jr., Hudson, MA (US); Brett Quinn, Cotuit, MA (US); John Darling, McKinney, TX (US)

(73) Assignee: Dell Products L.P., Hopkinton, MA (US)

( * ) Notice: Subject to any disclaimer, the term of this patent is extended or adjusted under 35 U.S.C. 154(b) by 67 days.

(21) Appl. No.: 18/524,014

(22) Filed: Nov. 30, 2023

(51) Int. Cl.
G06F 3/06 (2006.01)

(52) U.S. Cl.
CPC .......... G06F 3/0619 (2013.01); G06F 3/065 (2013.01); G06F 3/067 (2013.01)

(58) Field of Classification Search
CPC ......... G06F 3/0619; G06F 3/065; G06F 3/067
See application file for complete search history.

(56) References Cited

U.S. PATENT DOCUMENTS

| | | | |
|---|---|---|---|
| 9,811,272 B1* | 11/2017 | Lecrone | G06F 11/2069 |
| 10,891,205 B1* | 1/2021 | Trulli, Jr. | G06F 11/2079 |
| 2022/0100620 A1* | 3/2022 | Quinn | G06F 13/1668 |
| 2023/0305727 A1* | 9/2023 | Blea | G06F 3/0665 |

* cited by examiner

*Primary Examiner* — Jason W Blust
(74) *Attorney, Agent, or Firm* — Anderson Gorecki LLP

(57) ABSTRACT

RDF/QAR bandwidth reduction is a GDDR feature that allows for separate synchronous-only RDF groups from sites DC1→DC2 to be included in the QAR consistency group definition without RDF/A protection. The devices in these sync-only RDF groups form perfect quadruplets like regular QAR devices, but the RDF groups from sites DC1→DC3 and DC2→DC4 are not included in QAR-A and QAR-B Multi Session Consistency group definitions. Instead, these sync-only pairing RDF groups are replicated to the secondary region using ADCOPY-DISK mode or not replicating at all (suspended). The sync-only devices have no QAR recovery capability from sites DC3→DC4, but device pairing from DC3→DC4 is present via sync-only RDF groups.

18 Claims, 3 Drawing Sheets

GDDR RDF/QAR BANDWIDTH REDUCTION

TECHNICAL FIELD

The subject matter of this disclosure is generally related to electronic data storage.

BACKGROUND

Electronic data storage is a critical infrastructure for organizational processes that rely on software. A typical datacenter includes clusters of server computers and multiple data storage nodes that are interconnected via network switches. The servers run instances of host applications that support organizational processes such as email, accounting, inventory control, e-business, and engineering. Host application data is maintained by the storage nodes. A host application image is a collection of logical disk drives, known as storage objects, devices, or volumes, on which all the data for a single host application is maintained. The host application image may be replicated at different data centers to enable failover without significant interruption of the host applications. In general, replication may be synchronous or asynchronous.

SUMMARY

An apparatus in accordance with some implementations comprises a geographically dispersed disaster restart data facility with quadrilateral replication comprising a first storage array in a first datacenter in a first region, a second storage array in a second datacenter in the first region, a third storage array in third datacenter in a second region, and a fourth storage array in fourth datacenter in the second region; the first storage array configured to maintain a first R11 storage object that is synchronously replicated and autoswap protected to a first R21 storage object maintained by the second storage array, while maintaining consistency; the first storage array further configured to maintain a second R11 storage object that is synchronously replicated and autoswap protected to a second R21 storage object maintained by the second storage array, while maintaining consistency; the first storage array further configured to asynchronously replicate the first R11 storage object to a third R21 storage object maintained by the third storage array, while maintaining consistency; the first storage array further configured to replicate the second R11 storage object using an adaptive copy mode in which a background process transmits updates accumulated on the second R11 storage object to a fourth R21 storage object in the third storage array, without maintaining consistency; the second storage array configured to maintain a first R21 storage object that is paired with the first R11 storage object; the second storage array further configured to maintain a second R21 storage object that is paired with the second R11 storage object; the second storage array further configured to asynchronously replicate the first R21 storage object to a first R22 storage object maintained by the fourth storage array, while maintaining consistency; the second storage array further configured to replicate the second R21 storage object using an adaptive copy mode in which a background process transmits updates accumulated on the second R21 storage object to a second R22 storage object maintained by the fourth storage array, without maintaining consistency; the third storage array configured to maintain a third R21 storage object that is paired with the first R11 storage object maintained by the first storage array; the third storage array further configured to maintain a fourth R21 storage object that is paired with the second R11 storage object maintained by the first storage array; the third storage array further configured to pair the third R21 storage object with the first R22 storage object maintained by the fourth storage array without replication, with the ability to differentially resume synchronous and autoswap protected replication in case of a regional disaster that eliminates both the first and the second storage array as well as in case of a planned region swap; the third storage array further configured to pair the fourth R21 storage object with the second R22 storage object maintained by the fourth storage array without replication, with the ability to resume synchronous and autoswap protected replication with full volume synchronization in case of a regional disaster that eliminates both the first and the second storage array as well as in case of a planned region swap; the fourth storage array configured to maintain a first R22 storage object that is paired with both the first R21 storage object maintained by the second storage array and the third R21 storage object maintained by the third storage array, allowing updates from only one of those R21 storage objects at any point in time; the fourth storage array further configured to maintain a second R22 storage object that is paired both with the second R21 storage object maintained by the second storage array and the fourth R21 storage object maintained by the third storage array, allowing updates from only one of those R21 storage objects at any point in time.

A method in accordance with some implementations comprises, in a storage system comprising a first storage array in a first datacenter in a first region, a second storage array in a second datacenter in the first region, a third storage array in third datacenter in a second region, and a fourth storage array in fourth datacenter in the second region: maintaining two R11 storage objects by the first storage array; synchronously replicating two R11 to two R21 storage objects maintained by the second storage array; pairing one R11 to an R21 storage object maintained by the third storage array; pairing the second R11 to another R21 storage maintained by the third storage array; pairing one R21 storage object maintained by the second storage array with one R22 storage object maintained by the fourth storage array; and pairing the other R21 storage object maintained by the second array with another R22 storage object maintained by the fourth array.

In accordance with some implementations, a non-transitory computer-readable storage medium stores instructions that are executed by a computer to perform a method comprising, in a storage system comprising a first storage array in a first datacenter in a first region, a second storage array in a second datacenter in the first region, a third storage array in third datacenter in a second region, and a fourth storage array in fourth datacenter in the second region: maintaining two R11 storage objects by the first storage array; synchronously replicating two R11 to two R21 storage objects maintained by the second storage array; pairing one R11 to an R21 storage object maintained by the third storage array; pairing the second R11 to another R21 storage maintained by the third storage array; pairing one R21 storage object maintained by the second storage array with one R22 storage object maintained by the fourth storage array; and pairing the other R21 storage object maintained by the second array with another R22 storage object maintained by the fourth array.

The summary does not limit the scope of the claims or the disclosure. All examples, embodiments, aspects, implemen-

Various features and advantages will become more apparent from the following detailed description of exemplary embodiments in conjunction with the drawings.

DETAILED DESCRIPTION

The terminology used in this disclosure should be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" refer to features that are abstractions of other features, such as abstractions of tangible features. The term "physical" refers to tangible features that possibly include, but are not limited to, electronic hardware. For example, multiple virtual computers could operate simultaneously on one physical computer. The term "logic" refers to special purpose physical circuit elements, firmware, software, computer instructions that are stored on a non-transitory computer-readable medium and implemented by multi-purpose tangible processors, and any combinations thereof. Embodiments of the inventive concepts are described as being implemented in a data storage system that includes host servers and a storage array as the storage node. Such implementations are not limiting. For example, a wide variety of storage nodes might be implemented with the inventive concepts. Those of ordinary skill in the art recognize that there are a wide variety of implementations of the inventive concepts within the scope of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
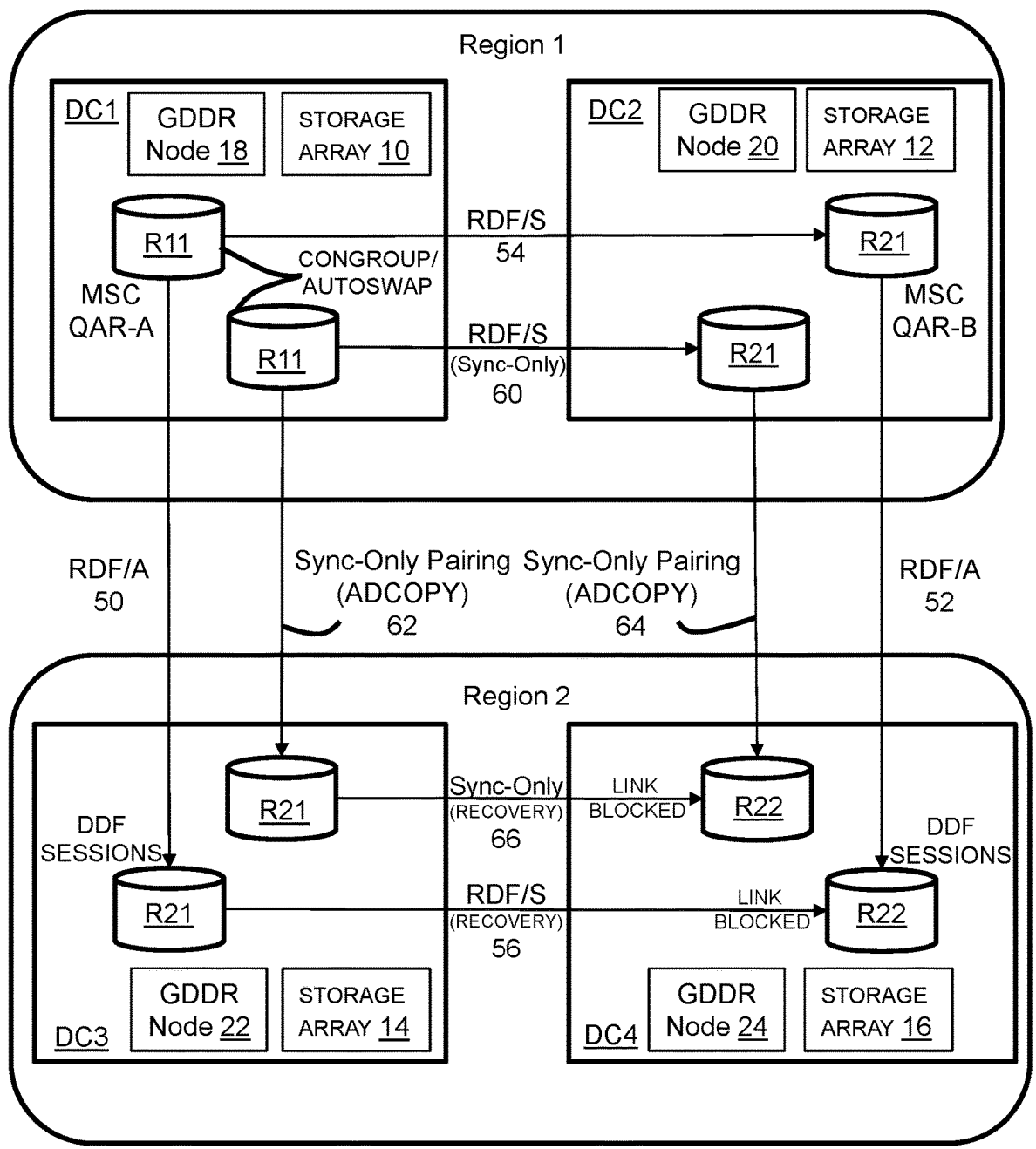
FIG. 1 illustrates an implementation of reduced bandwidth GDDR RDF/QAR.

FIG. 1 illustrates an implementation of reduced-bandwidth Geographically Dispersed Disaster Restart (GDDR) Remote Data Facility with Quadrilateral Asynchronous Replication (RDF/QAR). The GDDR RDF/QAR data storage system includes four data centers DC1, DC2, DC3, DC4 that are deployed in two geographic regions labelled as region 1 and region 2. DC1 and DC2 are in region 1. DC3 and DC4 are in region 2. DC1, which is a primary site, includes a storage array 10 and GDDR node 18. DC2, which is a secondary site, includes a storage array 12 and GDDR node 20. DC3, which is a primary site, includes a storage array 14 and GDDR node 22. DC4, which is a secondary site, includes a storage array 16 and GDDR node 24. Intra-regional links such as DC1 to DC2 have a maximum allowable physical distance, e.g., 200 km. Inter-regional links do not have such a limit and are greater than the intra-regional limit in some implementations.

The GDDR nodes 18, 20, 22, 24 may be implemented on separate logical partitions of different mainframe computers at different DC sites. Each GDDR node monitors its local datacenter for failures such as inter-DC communication failures and failures associated with the local storage arrays. Each datacenter is depicted with a single storage array for purposes of explanation but would typically include two or more storage arrays. The GDDR nodes may be configured to automatically respond to failures by performing actions such as automated site swaps in which a primary site fails over to a secondary site so that production data remains accessible and host applications continue functioning. Swapping replica device R1/R2 personalities allows the host application to be restarted at the remote site after failure at the production site. An R1 device is a member of the device pair at the source (production) site. R1 devices are generally Read/Write accessible to the application host. An R2 device is a member of the device pair at the target (remote) site. During normal operations, host IO writes to the R1 device are mirrored over RDF links to the R2 device. In general, data on R2 devices is not available to the host application while the RDF relationship is active. In RDF synchronous mode, however, an R2 device can be in a Read-Only mode that allows a host to read from the R2. R11 devices operate as the R1 device in a configuration with two R2 devices. Links to both R2 devices are active. R21 devices have a dual role and are used in cascaded 3-site configurations. R22 devices have two R1 devices, only one of which is active at a time. The software that implements such monitoring and failure response may be referred to as Differential Data Facility (DDF).

Full-bandwidth RDF/QAR is a four-site implementation of synchronous replication (RDF/S) and asynchronous replication (RDF/A) that enables differential resynchronization between sites along the perimeter of a "square" RDF topology using redundant RDF/A connections 50, 52 for continuous Disaster Recovery (DR) protection out of region. A dataset such as a host application image stored on storage objects of a Versioned Data Group (VDG) is maintained at DC1 by storage array 10 on replica R11. R11 is synchronously replicated at DC2 on replica R21 by storage array 12 via RDF/S connection 54. R11 is synchronously replicated by marking updated tracks of R11 as invalid until the changes are written to the synchronous remote replica R21 in DC2. Synchronously replicated host writes are contemporaneously written to both storage arrays in real time before the host application IO completes. Acknowledgments are not sent to the host until the data is stored in cache on both storage arrays, so remote storage array 12 must return an acknowledgement of replication of the changes to storage array 10 before the updated tracks on R11 can be marked valid and accessed again by a host application. RDF/S maintains a real-time mirror image of data between R1 and R2 devices. R11 is asynchronously replicated at DC3 on replica R21 by storage array 14 via RDF/A connection 50. RDF/A maintains a dependent-write consistent copy between the R1 and R2 devices. All host writes are collected over a configurable time interval, e.g., from 15-60 seconds, and sent to the remote storage array as a "delta set." Unlike synchronous replication, local storage array 10 does not wait for an acknowledgement of replication of the changes by remote storage array 14 before marking the updated tracks as valid. R21 is asynchronously replicated at DC4 on replica R22 by storage array 16 via RDF/A connection 52. R11 is asynchronously replicated by writing updated tracks of R11 to the asynchronous remote replica R21. Replica R21 is synchronously replicated at DC4 on replica R22 by storage array 16 via RDF/S connection 56. Asynchronous replication may be more practical to implement than synchronous replication when acknowledgment receipt latency would be too disruptive to host application performance. Acknowledgment receipt latency is at least in part a function of physical distance so inter-region links are subject to greater latency than intra-region links. Advantageously, all devices in the full-bandwidth RDF/QAR configuration form perfect quadruplets, with R11 devices at DC1, R21 devices at DC2 and DC3, and R22 devices at DC4. DDF sessions are activated at sites DC3 and DC4 at startup and are rotated in coordination with the opposite leg RDF/A cycle switches. The RDF/SQAR configuration provides the ability to recover from a single or dual unplanned site outage in one region with RDF/S protection established differentially between the recover sites in another region. This enables rapid resumption of a workload with RDF/S and autoswap protection in the other region. In certain failure scenarios, it also provides zero data loss recovery across regions. However, zero data loss recovery across regions may not always be necessary.

The reduced-bandwidth GDDR RDF/QAR allows separate synchronous-only RDF groups from sites DC1 to DC2 to be included in a QAR Consistency Group (ConGroup) definition with no RDF/A protection. The devices in the sync-only RDF groups form perfect quadruplets like full-bandwidth QAR devices, but the RDF groups from sites DC1 to DC3 and DC2 to DC4 are not included in QAR-A and QAR-B Multi Session Consistency (MSC) group definitions. Instead, these RDF groups are paired to the secondary region using adaptive copy (ADCOPY) DISK mode. More specifically, the sync-only pairing RDF groups are characterized by special sync-only devices that have no QAR recovery leg from sites DC3 to DC4, i.e., no DDF sessions, but device pairing from DC3 to DC4 is present via sync-only RDF groups using RDF/S connection 66. The illustrated reduced-bandwidth GDDR RDF/QAR synchronously replicates R11 at DC2 on replica R21 by storage array 12 via RDF/S connection 60. R11 and R21 of region 1 are paired with R21 and R22 in region 2 via ADCOPY connections 62, 64. In ADCOPY-DISK mode, write IO data accumulates on the R11 and R21 replicas while background processes send the write IO data via the ADCOPY connections 62, 64 based on availability of CPU cycles and network bandwidth. The background copy process can be deferred if a write-pending limit is exceeded or mirrored memory of either storage array does not have enough free space for ADCOPY IOs, which may be assigned lower priority than other types of write-pending data. Unlike RDF/A, the changes are not sent at fixed time intervals over which all changes are accumulated. Consequently, the paired devices, e.g., (R11, R21—region 2) and (R21—region 1, R22), are permitted to be out of synchronization. The sync-only devices are managed in an automated fashion by the GDDR nodes in accordance with their sync-only character. For example, during out-of-region swaps, these devices are drained to the secondary region. Allowing devices to be included in the QAR configuration without RDF/A protection significantly reduces the long-distance bandwidth requirement for those devices while preserving full in-region consistency and autoswap protection, the minimal required level of out-of-region DR protection, and redundant out-of-region DR protection. The reduced-bandwidth GDDR RDF/QAR is particularly suitable for high-intensity work volumes that require uninterrupted availability in the case of a site outage, which is provided by autoswap, but only require volume structure integrity in regional disaster recovery scenarios.

Figure 2:
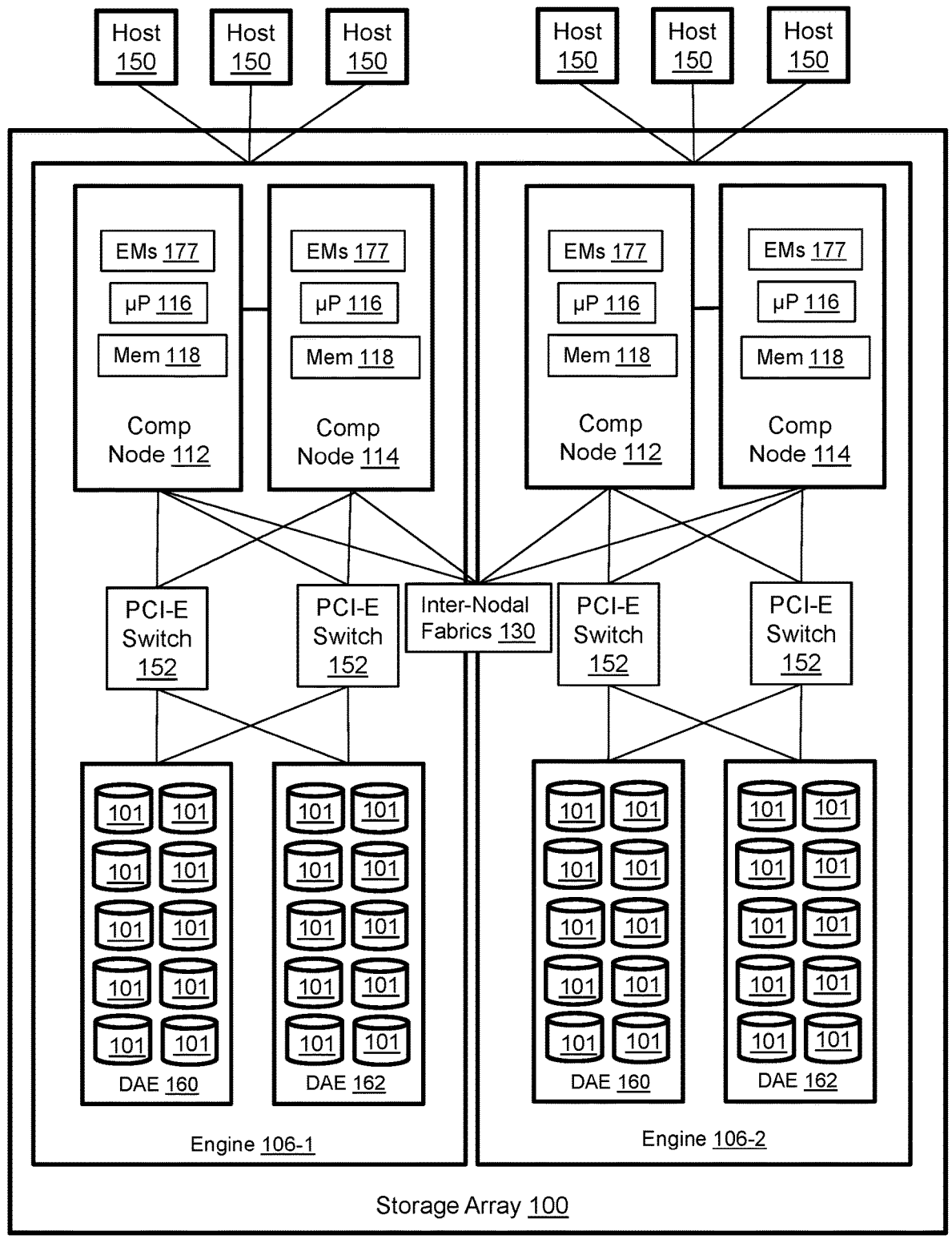
FIG. 2 illustrates a storage array in greater detail.

FIG. 2 illustrates an example of a storage array 100 in greater detail. The illustrated storage array 100 is shown with two engines 106-1, 106-2, but might include any number of engines. Each engine includes disk array enclosures (DAEs) 160, 162 and a pair of peripheral component interconnect express (PCI-e) interconnected compute nodes 112, 114 (aka storage directors) in a failover relationship. Within each engine, the compute nodes and DAEs are interconnected via redundant PCI-E switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant internodal channel-based InfiniBand fabrics 130. Each compute node 112, 114 runs emulations (EMs 177) for completing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation.

Figure 3:
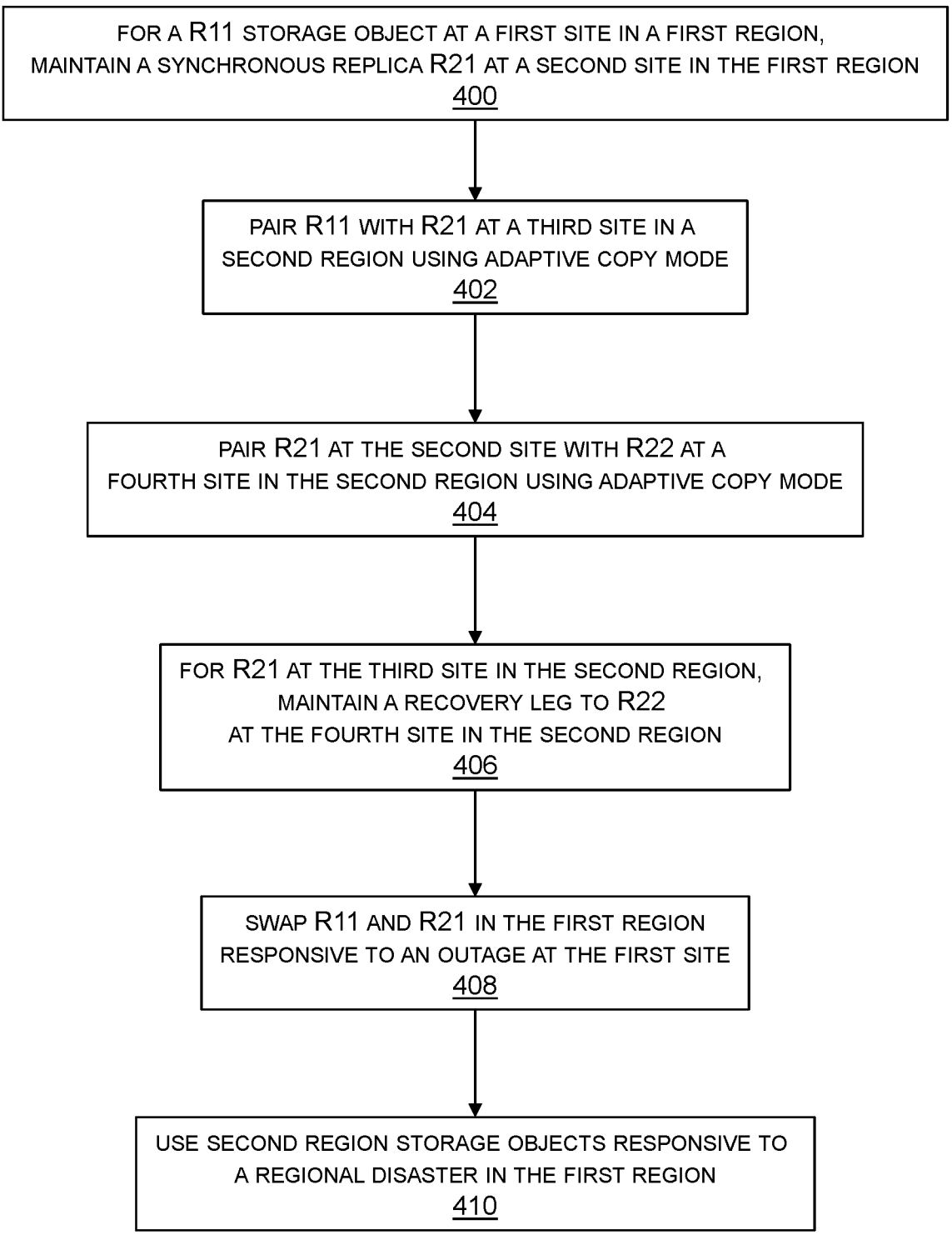
FIG. 3 illustrates a method for implementing GDDR RDF/QAR bandwidth reduction.

FIG. 3 illustrates a method for implementing GDDR RDF/QAR bandwidth reduction. Step 400 is maintaining sync-only RDF groups by synchronously replicating an R11 storage object on an R21 storage object where R11 is at a first site in a first region and R21 is at a second site in the first region. Step 402 is sync-only pairing R11 with an R21 storage object at a third site in a second region using adaptive copy mode. Step 404 is sync-only pairing R21 (second site) with an R22 storage object at a fourth site in the second region using adaptive copy mode. Step 406 is synchronously replicating R21 (third site) on R22 at the fourth site. Responsive to an outage at the first site, replica R11 and replica R21 (second site) are swapped such that R21 becomes the primary production image and R11 becomes the secondary in a swap as indicated in step 408. Responsive to a regional disaster in the first region, the R21 and R22 replicas in the second region can be used to recreate the existing volume structure.

Specific examples have been presented to provide context and convey inventive concepts. The specific examples are not limiting. A wide variety of modifications may be made without departing from the scope of the inventive concepts described herein. Moreover, the features, aspects, implementations, and embodiments described herein may be combined in any technically possible way. Accordingly, modifications and combinations are within the scope of the following claims.

What is claimed is:

1. An apparatus comprising:
a geographically dispersed disaster restart data facility with quadrilateral replication comprising a first storage array in a first datacenter in a first region, a second storage array in a second datacenter in the first region, a third storage array in third datacenter in a second region, and a fourth storage array in fourth datacenter in the second region;
the first storage array configured to maintain a first R11 storage object that is synchronously replicated and autoswap protected to a first R21 storage object maintained by the second storage array, while maintaining consistency;
the first storage array further configured to maintain a second R11 storage object that is synchronously replicated and autoswap protected to a second R21 storage object maintained by the second storage array, while maintaining consistency;
the first storage array further configured to asynchronously replicate the first R11 storage object to a third R21 storage object maintained by the third storage array, while maintaining consistency;
the first storage array further configured to replicate the second R11 storage object using an adaptive copy mode in which a background process transmits updates accumulated on the second R11 storage object to a fourth R21 storage object in the third storage array, without maintaining consistency;
the second storage array configured to maintain a first R21 storage object that is paired with the first R11 storage object;
the second storage array further configured to maintain a second R21 storage object that is paired with the second R11 storage object;
the second storage array further configured to asynchronously replicate the first R21 storage object to a first R22 storage object maintained by the fourth storage array, while maintaining consistency;
the second storage array further configured to replicate the second R21 storage object using an adaptive copy mode in which a background process transmits updates accumulated on the second R21 storage object to a second R22 storage object maintained by the fourth storage array, without maintaining consistency;
the third storage array configured to maintain a third R21 storage object that is paired with the first R11 storage object maintained by the first storage array;
the third storage array further configured to maintain a fourth R21 storage object that is paired with the second R11 storage object maintained by the first storage array;
the third storage array further configured to pair the third R21 storage object with the first R22 storage object maintained by the fourth storage array without replication, with the ability to differentially resume synchronous and autoswap protected replication in case of a regional disaster that eliminates both the first and the second storage array as well as in case of a planned region swap;
the third storage array further configured to pair the fourth R21 storage object with the second R22 storage object maintained by the fourth storage array without replication, with the ability to resume synchronous and autoswap protected replication with full volume synchronization in case of a regional disaster that eliminates both the first and the second storage array as well as in case of a planned region swap;
the fourth storage array configured to maintain a first R22 storage object that is paired with both the first R21 storage object maintained by the second storage array and the third R21 storage object maintained by the third storage array, allowing updates from only one of those R21 storage objects at any point in time;
the fourth storage array further configured to maintain a second R22 storage object that is paired both with the second R21 storage object maintained by the second storage array and the fourth R21 storage object maintained by the third storage array, allowing updates from only one of those R21 storage objects at any point in time.

2. The apparatus of claim 1 further comprising a geographically dispersed disaster restart node at the second site, the third site and the fourth site.

3. The apparatus of claim 2 further comprising the geographically dispersed disaster restart node at the second site being configured to swap the R21 storage objects maintained by the second storage array with the R11 storage objects maintained by the first storage array responsive to an outage at the first site.

4. The apparatus of claim 2 further comprising the geographically dispersed disaster restart nodes at the third and fourth sites configured to prompt use of the R21 storage objects of the third site or the R22 storage objects of the fourth site responsive to a regional disaster at the first region.

5. The apparatus of claim 1 further comprising multiple storage arrays at each datacenter.

6. The apparatus of claim 1 further comprising replication from the second R11 storage object to the fourth R21 storage object being suspended.

7. The apparatus of claim 1 further comprising replication from the second R21 storage object to the second R22 storage object being suspended.

8. A method comprising:
in a storage system comprising a first storage array in a first datacenter in a first region, a second storage array in a second datacenter in the first region, a third storage array in third datacenter in a second region, and a fourth storage array in fourth datacenter in the second region:
maintaining two R11 storage objects by the first storage array;
synchronously replicating two R11 to two R21 storage objects maintained by the second storage array;
pairing one R11 to an R21 storage object maintained by the third storage array;
pairing the second R11 to another R21 storage maintained by the third storage array;
pairing one R21 storage object maintained by the second storage array with one R22 storage object maintained by the fourth storage array; and
pairing the other R21 storage object maintained by the second array with another R22 storage object maintained by the fourth array.

9. The method of claim 8 further comprising pairing the R11 storage object with the R21 storage object using an adaptive copy mode comprising a background process transmitting updates accumulated on R11 to the third storage array without maintaining consistency.

10. The method of claim 8 further comprising pairing the R21 storage object with the R22 storage object using an adaptive copy mode comprising a background process transmitting updates accumulated on R21 to the fourth storage array without maintaining consistency.

11. The method of claim 8 further comprising monitoring the storage system with a geographically dispersed disaster restart node at the second site.

12. The method of claim 11 further comprising the geographically dispersed disaster restart node at the second site swapping the R21 storage object maintained by the second storage array with the R11 storage object responsive to an outage at the first site.

13. The method of claim 8 further comprising a geographically dispersed disaster restart node prompting use of the R21 storage object of the third site or the R22 storage object of the fourth site responsive to a regional disaster at the first region.

14. A non-transitory computer-readable storage medium storing instructions that are executed by a computer in a storage system including a first storage array in a first datacenter in a first region, a second storage array in a second datacenter in the first region, a third storage array in third datacenter in a second region, and a fourth storage array in fourth datacenter in the second region, to perform a method comprising:
   maintaining two R11 storage objects by the first storage array;
   synchronously replicating two R11 to two R21 storage objects maintained by the second storage array;
   pairing one R11 to an R21 storage object maintained by the third storage array;
   pairing the second R11 to another R21 storage maintained by the third storage array;
   pairing one R21 storage object maintained by the second storage array with one R22 storage object maintained by the fourth storage array; and
   pairing the other R21 storage object maintained by the second array with another R22 storage object maintained by the fourth array.

15. The non-transitory computer-readable storage medium of claim 14 in which the method further comprises pairing the R11 storage object with the R21 storage object using an adaptive copy mode comprising a background process transmitting updates accumulated on R11 to the third storage array without maintaining consistency.

16. The non-transitory computer-readable storage medium of claim 14 in which the method further comprises pairing the R21 storage object with the R22 storage object using an adaptive copy mode comprising a background process transmitting updates accumulated on R21 to the fourth storage array without maintaining consistency.

17. The non-transitory computer-readable storage medium of claim 14 in which the method further comprises a geographically dispersed disaster restart node at the second site swapping the R21 storage object maintained by the second storage array with the R11 storage object responsive to an outage at the first site.

18. The non-transitory computer-readable storage medium of claim 14 in which the method further comprises a geographically dispersed disaster restart node prompting use of the R21 storage object of the third site or the R22 storage object of the fourth site responsive to a regional disaster at the first region.

\* \* \* \* \*